UNITED STATES PATENT OFFICE.

WILLIAM A. O. WUTH, OF PITTSBURG, PENNSYLVANIA.

DEPHOSPHORIZING IRON IN THE PUDDLING PROCESS.

SPECIFICATION forming part of Letters Patent No. 226,143, dated March 30, 1880.

Application filed August 4, 1879.

*To all whom it may concern:*

Be it known that I, WILLIAM AUGUSTUS OTTO WUTH, of the city of Pittsburg, in the county of Allegheny and State of Pennsylvania, have invented a new and useful Improved Method of Dephosphorizing Iron in the Puddling Process; and I do hereby declare the following to be a full, clear, and exact description thereof.

Among the various impurities with which iron is contaminated phosphorus is one of the most injurious and most difficult to remove. Various methods have been proposed to effect the elimination of phosphorus from iron, but none have been found to be at the same time practical and efficient.

It is a well-recognized fact that by the use of oxides in the process of decarburizing pig-iron the phosphorus becomes oxidized and combines with the slag or cinder, so that if the slag or cinder containing the phosphorus could be removed without injury to the iron under treatment the desired result of dephosphorizing the iron would be practically attained.

In the process of puddling iron as ordinarily practiced the silicon is first oxidized, so that by the time that the pig-iron under treatment in the puddling-furnace has been so far deprived of its carbon as to begin to sink in the bath of cinder or slag—or, as it is termed, "come to nature"—the phosphorus formerly contained in the iron is completely oxidized, and is practically transferred to the cinder. Unfortunately, however, the separation thus effected is not permanent, for as the heat of the furnace is raised during the operation of balling a portion of the phosphorus is taken up again by the iron. In order to obviate this difficulty of the reabsorption of a portion of the phosphorus from the cinder by the iron, it has been proposed and attempted to tap off the cinder before the process of puddling is completed, and either to finish the operation without the ordinary bath of molten cinder or to remove the iron from the puddling-furnace in an unfinished condition. But this method of dry-puddling is not economically successful, nor is it practically efficient in entirely removing the phosphorus, because, in the first place, the iron, when exposed by the removal of the protecting-bath of cinder, is rapidly oxidized, causing so great a waste as to render this method practically useless; and, in the second place, the cinder cannot be so completely removed by tapping as that some of it will not adhere to and become mixed with the iron, so large a percentage still remaining that the phosphorus absorbed therefrom by the iron is highly detrimental to it.

My improvement, then, consists in obviating the difficulty arising from the exposure of the iron on tapping off the cinder which contains the oxidized phosphorous, and in so diluting the remaining cinder as practically to prevent the reabsorption of phosphorus by the iron by supplying the place of the removed cinder by a fresh charge of artificial cinder substantially free from phosphorus.

In the practice of my improvement the process of puddling is conducted in the usual way up to the time when the iron begins to come to nature and drops to the bottom of the hearth, and so far needs no further description, as it is an operation well known and understood. When the puddling process has reached this stage the damper of the furnace is shut down, so as to lower the heat and prevent the oxidation of the spongy iron, which would otherwise result from the withdrawal of the cinder. The cinder is then drawn off through the tap-hole communicating with the hearth of the puddling-furnace, as much cinder being removed as will run therefrom. I then immediately introduce into the hearth a charge of fresh cinder, which rapidly melts and forms a cinder bath for the iron. The damper is then raised, and the process of puddling is carried on to completion in the usual way. The cinder which I use for this purpose should be as free as possible from sulphur and phosphorus, consisting, principally, of silicate of iron, with varying proportions of silicates of other bases. For this purpose I use, as most convenient, a mixture of open-hearth or Bessemer cinder and any iron ore which is low in phosphorus, such as Menomonee ore or imported Elba or Spanish ores, the relative proportion of these ingredients not being important, the object of supplying an artificial-cinder bath as free from phosphorus and other impurities as possible being kept in view.

Where very fine quality iron is not desired the artificial cinder may be composed of a mixture of heating-furnace cinder and any suitable iron ore which is low in phosphorus.

The amount of artificial cinder to be introduced will, of course, depend on the size of the hearth and the amount of iron therein to be protected, and may be left to the discretion of the puddler. One such charge of artificial cinder will ordinarily suffice practically to remove all the phosphorus from the iron, as it will so completely dilute the original cinder which contained the oxidized phosphorus and which remained after the tapping, as to render the amount of phosphorus which could possibly be reabsorbed by the iron very slight. If preferred, however, and to insure the more perfect removal of the phosphorus, the process may be repeated by tapping off the first charge of artificial cinder after it is fully melted and introducing a second charge.

The great importance of my improvement in an economic point of view is that by my process a common article of cold-short pig-iron will, when treated in the manner I have described, produce an article of wrought-iron equal to that made from Bessemer pig. If made of Bessemer pig, with the artificial cinder I first mentioned, the product will be equal to any Swedish iron and lower in phosphorus than any Lake Champlain blooms as heretofore made. I have ascertained by actual test that with a single charge of artificial cinder the phosphorus in iron made from Bessemer pig can be reduced to one hundredth of one per cent. Besides this great saving in the cost of iron, resulting from the making of the finest grades of iron or steel from a common and cheap pig-iron, the saving of the cinder is by no means unimportant.

The artificial cinder employed in my process, after being used in the puddling-furnace, having become rich in iron and being low in phosphorus, may be used in the blast-furnace to as good purpose and in the same way as any natural ore. By this means the cinder from the Bessemer or the open-hearth processes, which is ordinarily a waste product, being too low in iron to be worth working, becomes so enriched by admixture with ore in my process that it can be economically used, the same as natural ores, in the blast-furnace, thus effecting a considerable saving.

I do not claim, broadly, as my invention the tapping off of the cinder from the iron, nor the introduction of cinder or of silicate of iron into the hearth of the puddling-furnace during the process of puddling; neither do I claim, broadly, the addition of cinder during the puddling process; but What I do claim as my invention, and desire to secure by Letters Patent, is—

In puddling iron, the mode, substantially as hereinbefore described, of preventing the reabsorption by the iron of the phosphorus in the slag or cinder which remains after tapping off the cinder, and of preventing the oxidation of the iron consequent on such tapping off of the cinder, which consists in adding a fresh charge of cinder practically free from phosphorus to the iron in the hearth of the furnace after it has come to nature and previously to the increasing of the heat for the purpose of balling.

In testimony whereof I, the said WILLIAM AUGUSTUS OTTO WUTH, have hereunto set my hand.

W. A. OTTO WUTH.

Witnesses:
C. E. MILLIKEN,
T. B. KERR.